US009294326B2

(12) United States Patent
Zhang et al.

(10) Patent No.: US 9,294,326 B2
(45) Date of Patent: *Mar. 22, 2016

(54) DATA UNIT FORMAT FOR MULTI-USER DATA IN LONG-RANGE WIRELESS LOCAL AREA NETWORKS (WLANS)

(71) Applicant: MARVELL WORLD TRADE LTD., St. Michael (BB)

(72) Inventors: Hongyuan Zhang, Sunnyvale, CA (US); Raja Banerjea, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/605,894

(22) Filed: Jan. 26, 2015

(65) Prior Publication Data
US 2015/0139365 A1 May 21, 2015

Related U.S. Application Data

(63) Continuation of application No. 13/663,106, filed on Oct. 29, 2012, now Pat. No. 8,942,320.

(60) Provisional application No. 61/552,420, filed on Oct. 27, 2011.

(51) Int. Cl.
*H04L 27/06* (2006.01)
*H04L 27/26* (2006.01)
(Continued)

(52) U.S. Cl.
CPC ........ *H04L 27/2649* (2013.01); *H04L 27/2613* (2013.01); *H04L 27/2666* (2013.01); *H04W 84/12* (2013.01); *H04L 1/0003* (2013.01); *H04L 1/0009* (2013.01); *H04L 1/08* (2013.01)

(58) Field of Classification Search
CPC . H04L 27/2332; H04L 27/2273; H04L 27/22; H04L 25/067
USPC ................... 375/340, 260, 332, 329; 370/329
See application file for complete search history.

(56) References Cited

U.S. PATENT DOCUMENTS 8,155,138 B2    4/2012    van Nee
8,385,463 B2    2/2013    Oh et al.
(Continued)

FOREIGN PATENT DOCUMENTS

WO    WO-2011/031058 A2    3/2011
WO    WO-2011/130473 A1    10/2011
(Continued)

OTHER PUBLICATIONS

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

(Continued)

*Primary Examiner* — Khai Tran

(57) ABSTRACT

A method includes receiving a data unit that includes a signal (SIG) field and a data field. The SIG field provides information for interpreting the data field. The method also includes detecting a first symbol constellation rotation of at least a first orthogonal frequency division multiplexing (OFDM) symbol in the SIG field of the data unit, determining, based at least in part on the detected first symbol constellation rotation, a number of information bits per OFDM symbol in the SIG field of the data unit, processing the SIG field of the data unit according to the determined number of information bits per OFDM symbol in the SIG field, and processing the data field of the data unit according to the information for interpreting the data field as provided in the SIG field of the data unit.

16 Claims, 10 Drawing Sheets

(51) Int. Cl.
*H04W 84/12* (2009.01)
*H04L 1/00* (2006.01)
*H04L 1/08* (2006.01)

(56) References Cited

U.S. PATENT DOCUMENTS

| | | | |
|---|---|---|---|
| 8,526,351 B2 | 9/2013 | Fischer et al. | |
| 8,599,804 B2 | 12/2013 | Erceg et al. | |
| 8,724,720 B2 | 5/2014 | Srinivasa et al. | |
| 8,826,106 B2 | 9/2014 | Zhang et al. | |
| 8,867,653 B2 | 10/2014 | Zhang et al. | |
| 8,885,740 B2 | 11/2014 | Zhang et al. | |
| 8,891,435 B2 | 11/2014 | Zhang et al. | |
| 8,902,869 B2 | 12/2014 | Zhang et al. | |
| 8,942,320 B2 | 1/2015 | Zhang et al. | |
| 2009/0196163 A1 | 8/2009 | Du | |
| 2011/0002219 A1 | 1/2011 | Kim et al. | |
| 2011/0255620 A1 | 10/2011 | Jones, IV et al. | |
| 2012/0201316 A1 | 8/2012 | Zhang et al. | |
| 2012/0294294 A1 | 11/2012 | Zhang | |
| 2013/0107990 A1 | 5/2013 | Zhang | |
| 2014/0241451 A1* | 8/2014 | Lee et al. | 375/267 |
| 2014/0334413 A1* | 11/2014 | Seok | 370/329 |

FOREIGN PATENT DOCUMENTS

| | | |
|---|---|---|
| WO | WO-2012/122119 A1 | 9/2012 |
| WO | WO-2012/158557 A1 | 11/2012 |
| WO | WO-2012/158559 A1 | 11/2012 |
| WO | WO-2012/158563 A1 | 11/2012 |
| WO | WO-2012/158565 A1 | 11/2012 |

OTHER PUBLICATIONS

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).
IEEE Std 802.11ad™/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band *The Institute of Electrical and Electronics Engineers, Inc.*, pp. 1-679 (Jul. 2012).
IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).
Chen, "Home Network Basis: Transmission Environments and Wired/Wireless Protocols," *Prentice Hall*, pp. 1-26 (Jul. 2003).
Harada, "Project: IEEE P802.15 Working Group for Wireless Personal Area Network (WPANs)," IEEE 802.15-07-0693-003c, slides 24-33 (May 2007).
Hiertz, et al., "The IEEE 802.11 Universe," *IEEE Communications Magazine*, pp. 62-70, (Jan. 2010).
Perahia, et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, pp. 1-83 (Sep. 1999).
IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).
IEEE P802.11nTM/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).
IEEE Std. 802.11nTM "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).
IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).
IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

(56) References Cited

OTHER PUBLICATIONS

IEEE Std 802.3afTM "IEEE Standard for Information technology—Telecommunications and information exchange between systems—Local and metropolitan area networks—Specific requirements" Part 3: Carrier Sense Multiple Access with Collision Detection (CSMA/CD) Access Method and Physical Layer Specifications, Amendment: Data Terminal Equipment (DTE) Power via Media Dependent Interface (MDI), IEEE Computer Society, *The Institute of Electrical and Electronics Engineers, Inc.*, 133 pages (Jun. 18, 2003).

de Vegt, "Potential Compromise for 802.11ah Use Case Document", Institute of Electrical and Electronics Engineers, doc. No. IEEE 802.11-11/0457r0, pp. 1-27 (Mar. 2011).

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

Mujtaba, S.A. "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Park, "Proposed Specification Framework for TGah D9.x", *The Institute of Electrical and Electronics Engineers*, doc. No. IEEE 802.11-yy/xxxxr0, pp. 1-30 (Jul. 2012).

Park, "Proposed Specification Framework for TGah", *The Institute of Electrical and Electronics Engineers*, doc. No. IEEE 802.11-11/1137r6, pp. 1-13 (Mar. 2012).

Taghavi et al., "Introductory Submission for TGah", doc. No. IEEE 802.11-11/0062r0, *Institute for Electrical and Electronics Engineers*, pp. 1-5 (Jan. 14, 2011).

Vermani, et al. "Preamble Format for 1 MHz," *The Institute of Electrical and Electronics Engineers*, doc. No. IEEE 802.11-11/1482r2, pp. 1-30 (Nov. 2011).

Yu et al., "Coverage extension for IEEE802.11ah," *The Institute of Electrical and Electronics Engineers*, doc. No. IEEE 802.11-11/0035r1, pp. 1-10 (Jan. 2011).

Zhang et al., "11ah Data Transmission Flow," *The Institute of Electrical and Electronics Engineers*, doc. No. IEEE 802.11-11/1484r1, pp. 1-15 (Nov. 2011).

Zhang et al., "1MHz Waveform in Wider BW", *The Institute of Electrical and Electronics Engineers*, doc. No. IEEE 802.11-12/0309r1, pp. 1-10 (Mar. 2012).

International Search Report and Written Opinion in International Application No. PCT/US2012/062427, mailed Jan. 25, 2013.

International Preliminary Report on Patentability in International Application No. PCT/US2012/062427, mailed May 8, 2014.

Examination Report Communication pursuant to Article 94(3) EPC in European Application No. 12 799 352.5-1505, dated May 11, 2015 (5 pages).

\* cited by examiner

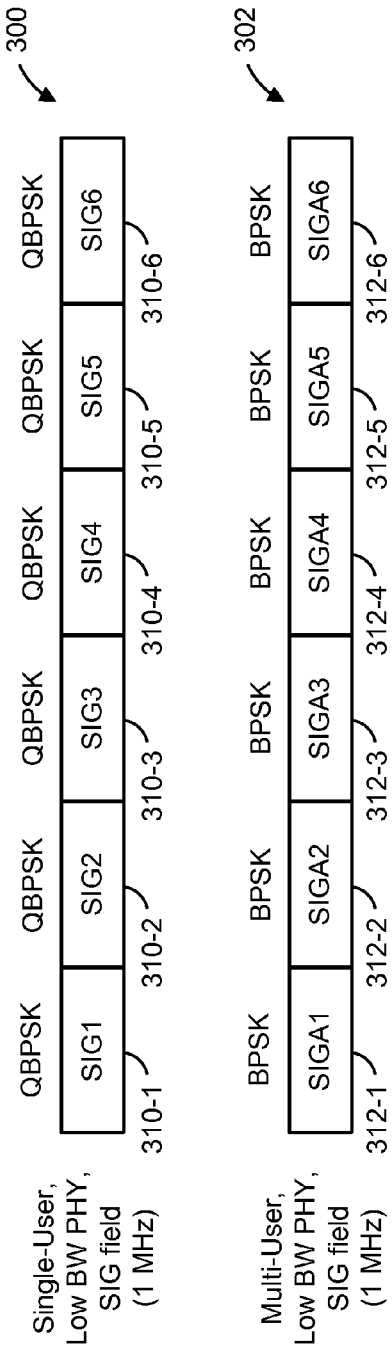
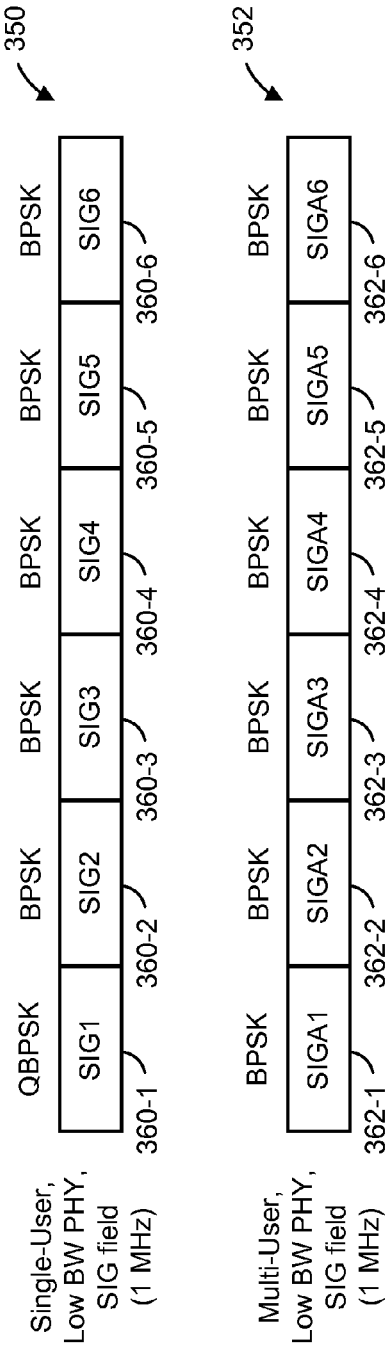
FIG. 6A
FIG. 6B

DATA UNIT FORMAT FOR MULTI-USER DATA IN LONG-RANGE WIRELESS LOCAL AREA NETWORKS (WLANS)

CROSS-REFERENCES TO RELATED APPLICATIONS

This disclosure is a continuation of U.S. Ser. No. 13/663,106, entitled "Data Unit Format for Multi-User Data in Long-Range Wireless Local Area Networks (WLANS)," filed on Oct. 29, 2012, now U.S. Pat. No. 8,942,320, which claims the benefit of U.S. Provisional Patent Application No. 61/552,420, entitled "11ah 1 MHz MU Format," filed on Oct. 27, 2011. The disclosures of the applications identified above are incorporated by reference herein in their entireties.

FIELD OF THE DISCLOSURE

The present disclosure relates generally to communication networks and, more particularly, to long-range wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

Work has begun on two new standards, IEEE 802.11 ah and IEEE 802.11af, each of which will specify wireless network operation in sub-1 GHz frequencies. Low frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub-1 GHz range that remain unlicensed, with different specific unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

In one embodiment, a method includes receiving a data unit that includes a signal (SIG) field and a data field. The SIG field provides information for interpreting the data field. The method also includes detecting a first symbol constellation rotation of at least a first orthogonal frequency division multiplexing (OFDM) symbol in the SIG field of the data unit, determining, based at least in part on the detected first symbol constellation rotation, a number of information bits per OFDM symbol in the SIG field of the data unit, processing the SIG field of the data unit according to the determined number of information bits per OFDM symbol in the SIG field, and processing the data field of the data unit according to the information for interpreting the data field as provided in the SIG field of the data unit.

In other embodiments, the method may comprise one or more (or none) of the following elements. Determining a number of information bits per OFDM symbol in the SIG field may include determining one or more of (i) a modulation type of the SIG field, (ii) a coding rate of the SIG field, and (iii) a number of bit repetitions of the SIG field, and processing the SIG field of the data unit according to the determined number of information bits per OFDM symbol in the SIG field may include processing the SIG field of the data unit according to the determined one or more of (i) the modulation type, (ii) the coding rate, and (iii) the number of bit repetitions. Detecting a first symbol constellation rotation may include detecting whether at least the first OFDM symbol in the SIG field of the data unit is binary phase shift key (BPSK) modulated or quaternary BPSK (QBPSK) modulated. Determining one or more of (i) a modulation type of the SIG field, (ii) a coding rate of the SIG field, and (iii) a number of bit repetitions of the SIG field may include determining whether the SIG field includes a first number of bit repetitions or a second number of bit repetitions, and processing the SIG field of the data unit according to the determined number of information bits per OFDM symbol in the SIG field may include decoding the SIG field according to the determined number of bit repetitions. The method may further comprise determining, based at least in part on (i) the detected first symbol constellation rotation or (ii) a second symbol constellation rotation of at least a second OFDM symbol within the SIG field of the data unit, whether at least a portion of a preamble of the data unit is arranged according to a shorter format or a longer format. Determining whether at least a portion of a preamble of the data unit is arranged according to a shorter format or a longer format may include determining whether a portion of the preamble after the SIG field is arranged according to a single-user format or a multi-user format.

In another embodiment, an apparatus includes a network interface configured to receive a data unit that includes a signal (SIG) field and a data field. The SIG field provides information for interpreting the data field. The network interface is also configured to detect a first symbol constellation rotation of at least a first orthogonal frequency division multiplexing (OFDM) symbol in the SIG field of the data unit, determine, based on the detected first symbol constellation rotation, a number of information bits per OFDM symbol in the SIG field of the data unit, process the SIG field of the data unit according to the determined number of information bits per OFDM symbol in the SIG field, and process the data field of the data unit according to the information for interpreting the data field as provided in the SIG field of the data unit.

In other embodiments, the apparatus may comprise one or more (or none) of the following elements. The network interface may be configured to determine the number of information bits per OFDM symbol in the SIG field at least in part by determining one or more of (i) a modulation type of the SIG field, (ii) a coding rate of the SIG field, and (iii) a number of bit repetitions of the SIG field, and process the SIG field of the data unit according to the determined number of information bits per OFDM symbol in the SIG field at least in part by processing the SIG field of the data unit according to the determined one or more of (i) the modulation type, (ii) the coding rate, and (iii) the number of bit repetitions. The network interface may be configured to detect the first symbol constellation rotation at least in part by detecting whether at least the first OFDM symbol in the SIG field of the data unit is binary phase shift key (BPSK) modulated or quaternary BPSK (QBPSK) modulated. The network interface may be configured to determine one or more of (i) the modulation type of the SIG field, (ii) the coding rate of the SIG field, and (iii) the number of bit repetitions of the SIG field at least in part by determining whether the SIG field includes a first number of bit repetitions or a second number of bit repetitions, and process the SIG field of the data unit according to the determined number of information bits per OFDM symbol in the SIG field at least in part by decoding the SIG field according to the determined number of bit repetitions. The network interface may be further configured to determine, based at least in part on (i) the detected first symbol constellation rotation or (ii) a second symbol constellation rotation of at least a second OFDM symbol within the SIG field of the data unit, whether at least a portion of a preamble of the data unit is arranged according to a shorter format or a longer format. The network interface may be configured to determine whether at least the portion of the preamble of the data unit is arranged according to the shorter format or the longer format at least in part by determining whether a portion of the preamble after the SIG field is arranged according to a single-user format or a multi-user format.

In another embodiment, a method includes determining a first number of information bits per orthogonal frequency division multiplexing (OFDM) symbol to be used in generating a data field of a data unit, determining, based on the first number of information bits per OFDM symbol, a second number of information bits per OFDM symbol to be used in generating a signal (SIG) field of the data unit, determining, based on the second number of information bits per OFDM symbol, a first symbol constellation rotation, and generating the SIG field of the data unit according to the second number of information bits per symbol. The SIG field provides a receiver with information for interpreting the data field. The method also includes generating the SIG field of the data unit includes generating at least a first OFDM symbol according to the first symbol constellation rotation, and generating the data field of the data unit according to the first number of information bits per OFDM symbol.

In other embodiments, the method may comprise one or more (or none) of the following elements. Determining a first number of information bits per OFDM symbol to be used in generating the data field may include determining the first number of information bits per OFDM symbol based on channel state information. Determining a second number of information bits per OFDM symbol to be used in generating the SIG field may include setting the second number of information bits per OFDM symbol equal to the first number of information bits per OFDM symbol when the first number of information bits per OFDM symbol is a minimum number of information bits per OFDM symbol. Determining a first number of information bits per OFDM symbol to be used in generating the data field may include determining one or more of (i) a modulation type to be used in generating the data field, (ii) a coding rate to be used in generating the data field, and (iii) a number of bit repetitions to be used in generating the data field, and determining a second number of information bits per OFDM symbol to be used in generating the SIG field may include determining one or more of (i) a modulation type to be used in generating the SIG field, (ii) a coding rate to be used in generating the SIG field, and (iii) a number of bit repetitions to be used in generating the SIG field. Determining a first symbol constellation rotation based on the second number of information bits per OFDM symbol may include selecting binary phase shift key (BPSK) modulation or quaternary BPSK (QBPSK) modulation for the first OFDM symbol of the SIG field based on the determined one or more of (i) the modulation type to be used in generating the SIG field, (ii) the coding rate to be used in generating the SIG field, and (iii) the number of bit repetitions to be used in generating the SIG field. The method may further comprise determining a second symbol constellation rotation based on whether the data unit is a single-user data unit or a multi-user data unit, and generating the SIG field of the data unit may further include generating at least a second OFDM symbol according to the second symbol constellation rotation.

In another embodiment, an apparatus includes a network interface configured to determine a first number of information bits per OFDM symbol to be used in generating a data field of a data unit, determine, based on the first number of information bits per OFDM symbol, a second number of information bits per OFDM symbol to be used in generating a signal (SIG) field of the data unit, determine, based on the second number of information bits per OFDM symbol, a first symbol constellation rotation, and generate the SIG field of the data unit according to the second number of information bits per OFDM symbol. The SIG field provides a receiver with information for interpreting the data field. The network interface is also configured to generate the SIG field at least in part by generating at least a first OFDM symbol according to the first symbol constellation rotation, and generate the data field of the data unit according to the first number of information bits per OFDM symbol.

In other embodiments, the apparatus may comprise one or more (or none) of the following elements. The network interface may be configured to determine a first number of information bits per OFDM symbol to be used in generating the data field at least in part by determining the first number of information bits per OFDM symbol based on channel state information. The network interface may be configured to determine a first number of information bits per OFDM symbol to be used in generating the data field at least in part by determining one or more of (i) a modulation type to be used in generating the data field, (ii) a coding rate to be used in generating the data field, and (iii) a number of bit repetitions to be used in generating the data field, and determine a second number of information bits per OFDM symbol to be used in generating the SIG field at least in part by determining one or more of (i) a modulation type to be used in generating the SIG field, (ii) a coding rate to be used in generating the SIG field, and (iii) a number of bit repetitions to be used in generating the SIG field. The network interface may be configured to determine a first symbol constellation rotation based on the second number of information bits per OFDM symbol at least in part by selecting binary phase shift key (BPSK) modulation or quaternary BPSK (QBPSK) modulation for the first OFDM symbol of the SIG field based on the determined one or more of (i) the modulation type to be used in generating the SIG field, (ii) the coding rate to be used in generating the SIG field, and (iii) the number of bit repetitions to be used in generating the SIG field. The network interface may be configured to determine a second symbol constellation rotation based on whether the data unit is a single-user data unit or a multi-user data unit, and generate the SIG field of the data unit in part by generating at least a second OFDM symbol according to the second symbol constellation rotation.

BRIEF DESCRIPTION OF THE DRAWINGS

FIG. 6A is a diagram of example SIG fields of low bandwidth mode data units, corresponding to single-user and multi-user formats, according to an embodiment.

FIG. 6B is a diagram of example SIG fields of low bandwidth mode data units, corresponding to single-user and multi-user formats, according to an alternative embodiment.

DETAILED DESCRIPTION

Figure 1:
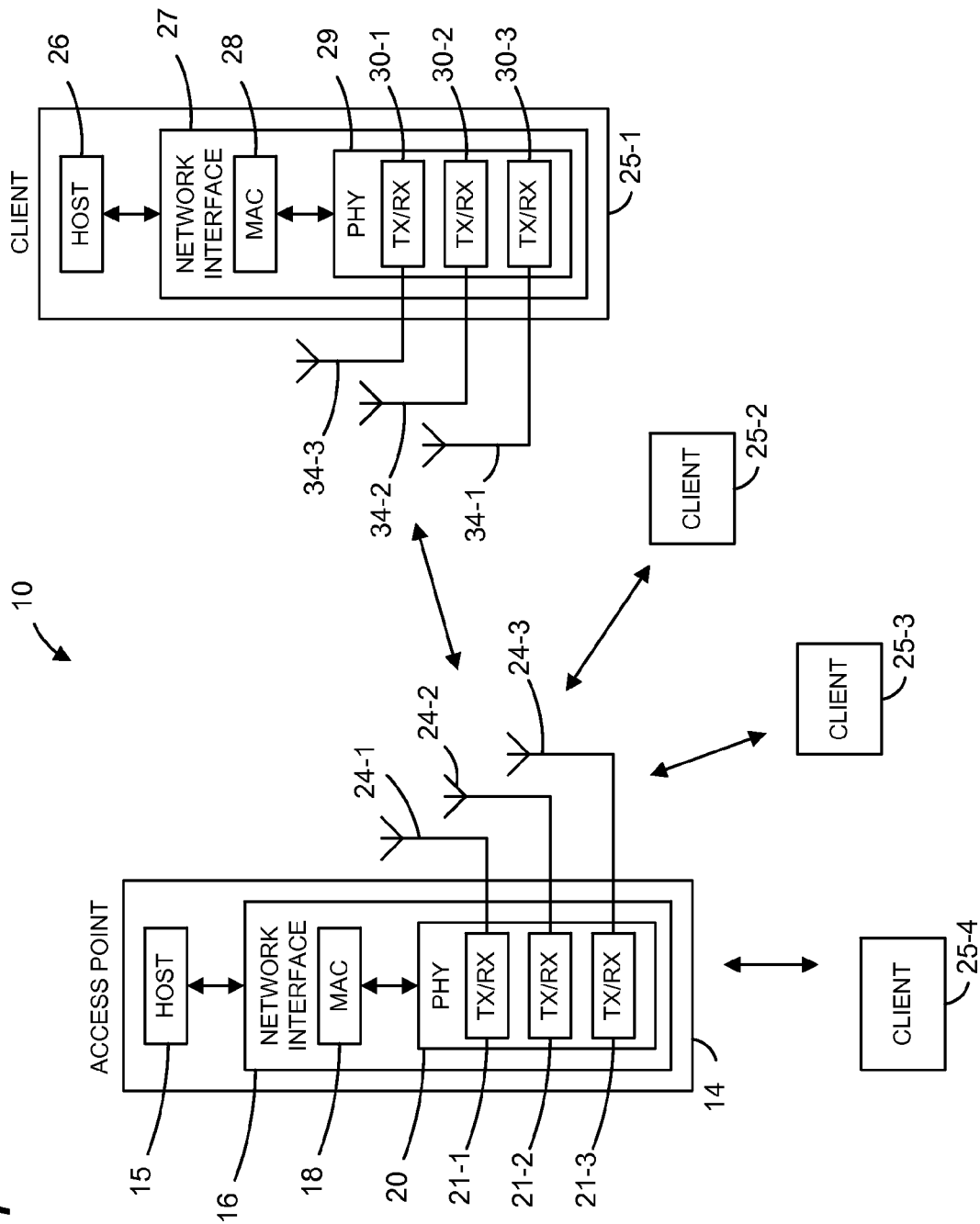
FIG. 1 is a block diagram of an example wireless local area network (WLAN), according to an embodiment.

In embodiments described below, a wireless network device such as an access point (AP) of a wireless local area network (WLAN) transmits data streams to one or more client stations. The AP is configured to operate with client stations according to at least a first communication protocol. In an embodiment, the first communication protocol defines operation in a sub-1 GHz frequency range, and is typically used for applications requiring long range wireless communication with relatively low data rates. The first communication protocol (e.g., IEEE 802.11af or IEEE 802.11ah) is referred to herein as a "long range" communication protocol. In some embodiments, the AP is also configured to communicate with client stations according to one or more other communication protocols which define operation in generally higher frequency ranges and are typically used for closer-range communications with higher data rates. The higher frequency communication protocols (e.g., IEEE 802.11a, IEEE 802.11n, and/or IEEE 802.11 ac) are collectively referred to herein as "short range" communication protocols. In some embodiments, physical layer (PHY) data units conforming to the long range communication protocol ("long range data units") are the same as or similar to data units conforming to a short range communication protocol ("short range data units"), but are generated using a lower clock rate. To this end, in an embodiment, the AP operates at a clock rate suitable for short range operation, and down-clocking is used to generate a clock to be used for the sub-1 GHz operation. As a result, in this embodiment, a long range data unit maintains the physical layer format of a short range data unit, but is transmitted over a longer period of time. Example formats of long range data units, according to various embodiments, are described in U.S. patent application Ser. No. 13/359,336, "Physical Layer Frame Format For Long Range WLAN," now U.S. Pat. No. 8,867,653, the disclosure of which is hereby incorporated by reference herein in its entirety.

In addition to this "normal mode" specified by the long range communication protocol, in some embodiments, the long range communication protocol also specifies a "low rate mode" with a data rate compared to the lowest data rate specified for the normal mode. In some of these embodiments, low rate mode data units are "low bandwidth mode" data units transmitted over a bandwidth less than the lowest channel bandwidth for normal mode data units. For example, low bandwidth mode data units are generated using a 32-point inverse discrete Fourier transform (IDFT) for transmission over a 1 MHz bandwidth, while normal mode data units are generated using the same clock rate, but a 64-point or larger IDFT for transmission over a 2 MHz or greater bandwidth is used, in an embodiment. A lower data rate allows the low rate mode to further extend communication range, and generally improves receiver sensitivity (or sensitivity gain). In various embodiments, the low rate mode is used, for example, as a control mode (e.g., for signal beacon or association procedures, transmit beamforming training operations, etc.), or as an extension of the normal mode for extended range. Example formats of low rate mode data units (including low bandwidth mode data units), and the generation of such data units, according to various embodiments, are described in U.S. patent application Ser. No. 13/366,064, "Control Mode PHY for WLAN," now U.S. Publication No. 2012-0201316, and U.S. patent application Ser. No. 13/494,505, "Low Bandwidth PHY for WLAN," now U.S. Pat. No. 8,826,106, the disclosures of which are hereby incorporated by reference herein in their entireties.

In some embodiments, normal mode data units and low rate mode data units include one or more short training fields (STFs) for packet detection and automatic gain control, one or more long training fields (LTFs) for channel estimation, and one or more signal (SIG) fields for indicating certain PHY characteristics of the data unit. In one embodiment, the SIG field includes information bits that specify the modulation type, coding rate, length, and other PHY characteristics of a data portion of the data unit. Based on this information, a receiver can successfully demodulate and/or decode the data portion of the data unit. In some embodiments, the SIG field additionally specifies one or more other PHY characteristics of the data unit, but without dedicating any additional information bits for that purpose. For example, in an embodiment, one or more OFDM symbols of the SIG field are modulated using a first symbol constellation rotation (e.g., zero degrees) to indicate to a receiver that the data unit is a single-user data unit, or with a second rotation (e.g., 90 degrees) to indicate to a receiver that the data unit is a multi-user data unit. In some embodiments, the SIG field specifies one or more PHY characteristics of the SIG field itself without dedicating any particular information bits to that purpose. For example, in an embodiment, one or more OFDM symbols of the SIG field are modulated using a first symbol constellation rotation or a second symbol constellation rotation to indicate to a receiver that the SIG field utilizes a first number of information bits per OFDM symbol or a second number of information bits per OFDM symbol (e.g., a lower or higher number of bit repetitions, in an embodiment), respectively.

FIG. 1 is a block diagram of an example WLAN 10 including an AP 14, according to an embodiment. The AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., one, two, four, five, etc.) of transceivers 21 and antennas 24 in other embodiments.

The WLAN 10 further includes a plurality of client stations 25. Although four client stations 25 are illustrated in FIG. 1, the WLAN 10 can include different numbers (e.g., one, two, three, five, six, etc.) of client stations 25 in various scenarios and embodiments. At least one of the client stations 25 (e.g., client station 25-1) is configured to operate at least according to the long range communication protocol. In some embodiments, at least one of the client stations 25 (e.g., client station 25-4) is a short range client station that is configured to operate at least according to one or more of the short range communication protocols.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., one, two, four, five, etc.) of transceivers 30 and antennas 34 in other embodiments.

In some embodiments, one, some, or all of the client stations 25-2, 25-3, and 25-4 has/have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the PHY processing unit 20 of the AP 14 is configured to generate data units conforming to the long range communication protocol and having formats described below. The transceiver(s) 21 is/are configured to transmit the generated data units via the antenna(s) 24. Similarly, the transceiver(s) 21 is/are configured to receive the data units via the antenna(s) 24. The PHY processing unit 20 of the AP 14 is also configured to process received data units conforming to the long range communication protocol and having formats described below, according to various embodiments.

In various embodiments, the PHY processing unit 29 of the client device 25-1 is configured to generate data units conforming to the long range communication protocol and having formats described below. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is also configured to process received data units conforming to the long range communication protocol and having formats described below, according to various embodiments.

In some embodiments, the client station 25-1 can selectively operate in either a normal mode (e.g., 2 MHz and wider bandwidths) or a low bandwidth mode (e.g., 1 MHz bandwidth). In an embodiment, the same clock rate is used in either mode, with different IDFT sizes being utilized to generate signals of different bandwidths (e.g., a 64-point or larger IDFT for the 2 MHz or wider bandwidths in normal mode, and a 32-point IDFT for the 1 MHz bandwidth in low bandwidth mode). In some of these embodiments, the low bandwidth mode is used as a control PHY. In other of these embodiments, the low bandwidth mode is used to extend the range of the normal mode.

Low bandwidth mode communications are generally more robust than normal mode communications, having a sensitivity gain that supports extended range communications. For example, in an embodiment in which a normal mode utilizes a 64-point IDFT (e.g., for a 2 MHz bandwidth signal) to generate normal mode data units, and in which a low bandwidth mode utilizes a 32-point IDFT (e.g., for a 1 MHz bandwidth signal) to generate low bandwidth mode data units, the low bandwidth mode provides approximately a 3 dB sensitivity gain. Moreover, in some embodiments, the low bandwidth mode introduces redundancy or repetition of bits into at least some fields of the data unit to further reduce the data rate and further improve sensitivity gain. For example, in various embodiments and/or scenarios, the low bandwidth mode introduces redundancy into the data portion and/or the SIG field of a low bandwidth mode data unit according to one or more repetition and modulation/coding schemes described below. In an embodiment where the low bandwidth mode includes a 2× repetition of information bits, for example, a further 3 dB sensitivity gain may be obtained. Still further, in some embodiments, the low bandwidth mode improves sensitivity gain by generating OFDM symbols in accordance with the lowest data rate modulation and coding scheme (MCS) of the normal mode, or in accordance with an MCS lower than the lowest data rate MCS of the normal mode. As an example, in an embodiment, data units in normal mode are generated according to a particular MCS selected from a set of MCSs, such as MCS0 (binary phase shift keying (BPSK) modulation and 1/2 coding rate) to MCS9 (quadrature amplitude modulation (QAM) and 5/6 coding rate), with higher-order MCSs corresponding to higher data rates. In one such embodiment, for example, normal mode data units are generated using MCS0 or higher (MCS1, MCS2, etc.) without repetition of information bits, whereas low bandwidth mode data units are generated using MCS0 with 2× repetition of information bits. Example embodiments of transmitters (e.g., within network interface 16 of AP 14, and/or network interface 27 of client station 25-1) configured to generate normal and low rate/bandwidth mode data units are described in U.S. patent application Ser. No. 13/494,505, now U.S. Pat. No. 8,826,106.

In the embodiments described below, low rate mode data units are transmitted using a lower bandwidth than normal mode data units, and are therefore referred to as "low bandwidth mode" data units. It is understood, however, that in other embodiments the data units of the low rate mode are not transmitted over a lower bandwidth than normal mode data units. In some embodiments, for example, low rate mode data units are transmitted using the same bandwidth as the minimum bandwidth for normal mode data units, and correspond to a lower data rate for other reasons (e.g., MCS and/or repetition of information bits). Further, FIGS. 2, 3 and 5-7 show the normal mode data units as corresponding to bandwidths of 2 MHz or greater, and low bandwidth mode data units as corresponding to a 1 MHz bandwidth. It is understood, however, that normal mode and low bandwidth mode data units of other embodiments may correspond to different bandwidths. It is also understood that the various fields shown, and/or the number of OFDM symbols per field shown, in FIGS. 2, 3 and 5-7 may differ in other embodiments.

Figure 2:
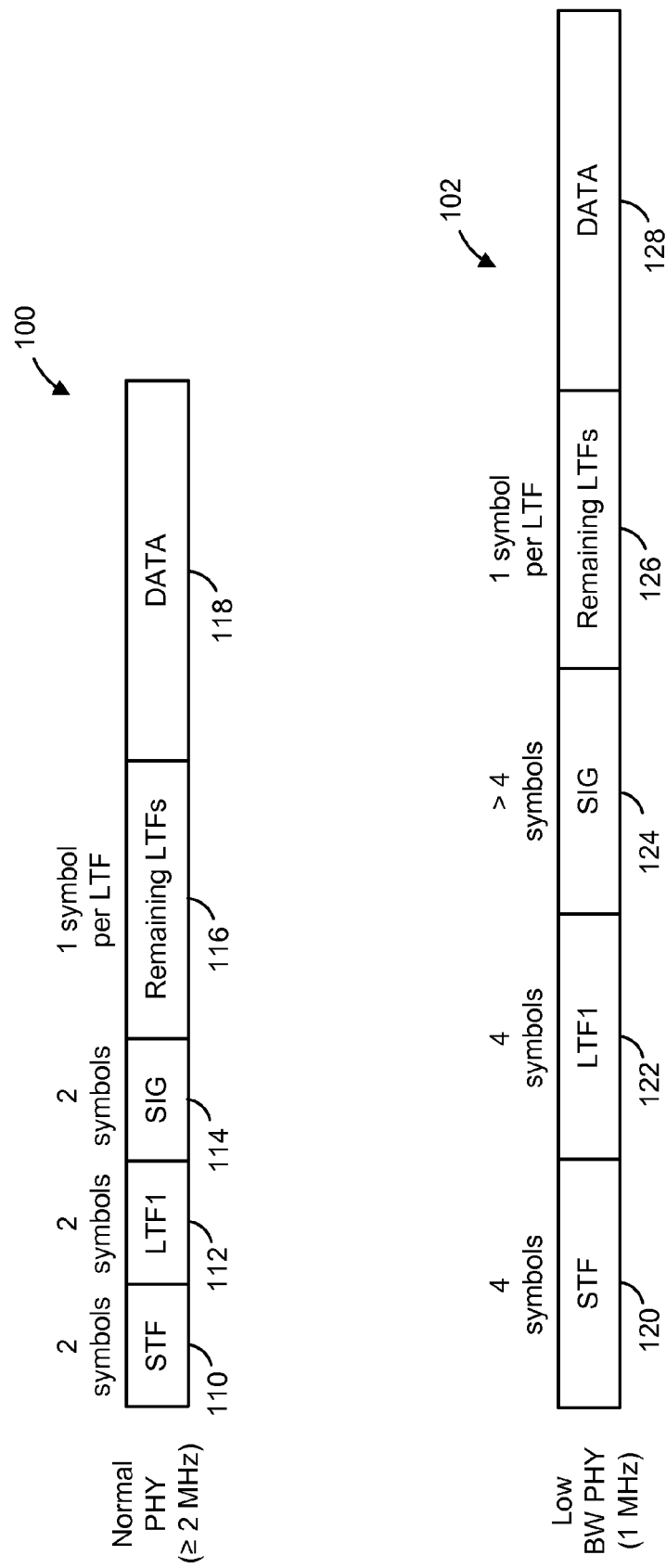
FIG. 2 is a diagram of example normal mode and low bandwidth mode data units, according to an embodiment.

FIG. 2 is a diagram of an example normal mode data unit 100 and low bandwidth mode data unit 102, according to an embodiment. The data units 100 and 102 are single-user data units. In one embodiment, and with reference to FIG. 1, the normal mode data unit 100 and low bandwidth mode data unit 102 are generated by network interface 16 of AP 14 and transmitted to client station 25-1. The normal mode data unit 100 includes an STF 110, a first LTF (LTF1) 112, a SIG field 114, any additional LTFs 116 (e.g., such that one LTF is included in data unit 100 per spatial stream), and a data field 118. Similarly, the low bandwidth mode data unit 102 includes an STF 120, a first LTF (LTF1) 122, a SIG field 124, any additional LTFs 126, and a data field 128. In an embodiment, the normal mode data unit 100 has the same format as an IEEE 802.11n data unit with a "Greenfield" preamble, and supports an MCS as low as MCS0. Moreover, in some of these embodiments, the low bandwidth mode data unit 100 has a similar format, but utilizes 2× repetition of information bits in addition to MCS0. As a result of the lower data rate due to 2× repetition and a lower bandwidth (fewer subcarriers), the low bandwidth mode data unit 102 includes additional OFDM symbols in some fields. For example, in the embodiment shown in FIG. 2, STF 110, LTF1 112 and SIG field 114 of normal mode data unit 100 each include two OFDM symbols, whereas STF 120, LTF1 122 and SIG field 124 of low bandwidth mode data unit 102 each include four or more OFDM symbols. In the case of SIG field 124, for example, five or six OFDM symbols may be needed in order to convey all of the necessary PHY information (e.g., MCS of data field 128, length of data field 128, etc.) to a receiver at the lower data rate. Various alternative embodiments of the fields in the normal mode data unit 100 are described in more detail in U.S. patent application Ser. No. 13/359,336, now U.S. Pat. No. 8,867,653, and various alternative embodiments of the fields in the low bandwidth mode data unit 102 are described in more detail in U.S. patent application Ser. No. 13/366,064 (now U.S. Publication No. 2012-0201316) and Ser. No. 13/494,505 (now U.S. Pat. No. 8,826,106).

Figure 3:
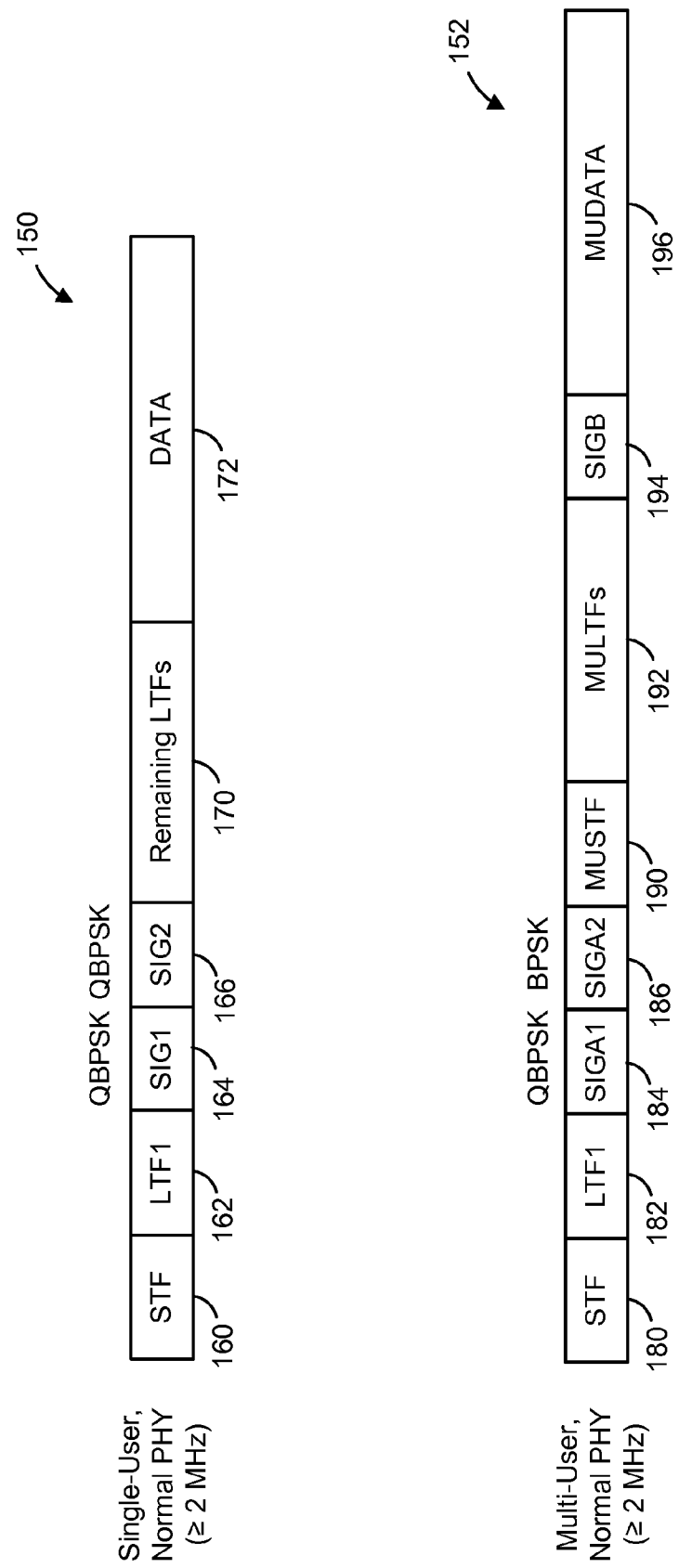
FIG. 3 is a diagram of example single-user and multi-user formats of a normal mode data unit, according to an embodiment.

In some embodiments, the normal bandwidth mode and the low bandwidth mode both support single-user and multi-user operation similar to single-user and multi-user operation as defined under IEEE 802.11ac. FIG. 3 is a diagram comparing an example single-user, normal mode data unit 150 with an example multi-user, normal mode data unit 152, according to an embodiment. In one embodiment and scenario, and with reference again to FIG. 1, the single-user normal mode data unit 150 is generated by network interface 16 of AP 14 and transmitted to client station 25-1, and the multi-user, normal mode data unit 152 is generated by network interface 16 of AP 14 and transmitted to two or more of the client stations 25. The single-user, normal mode data unit 150 includes an STF 160, an LTF (LTF1) 162, two OFDM symbols (SIG1, SIG2) 164, 166 of a SIG field, any additional LTFs 170, and a data field 172. In an embodiment, the single-user, normal mode data unit 150 is the same as the normal mode data unit 100 of FIG. 2, with the two symbols of SIG field OFDM symbols 164, 166 being shown separately rather than the single block 106 of FIG. 2.

Figure 4:
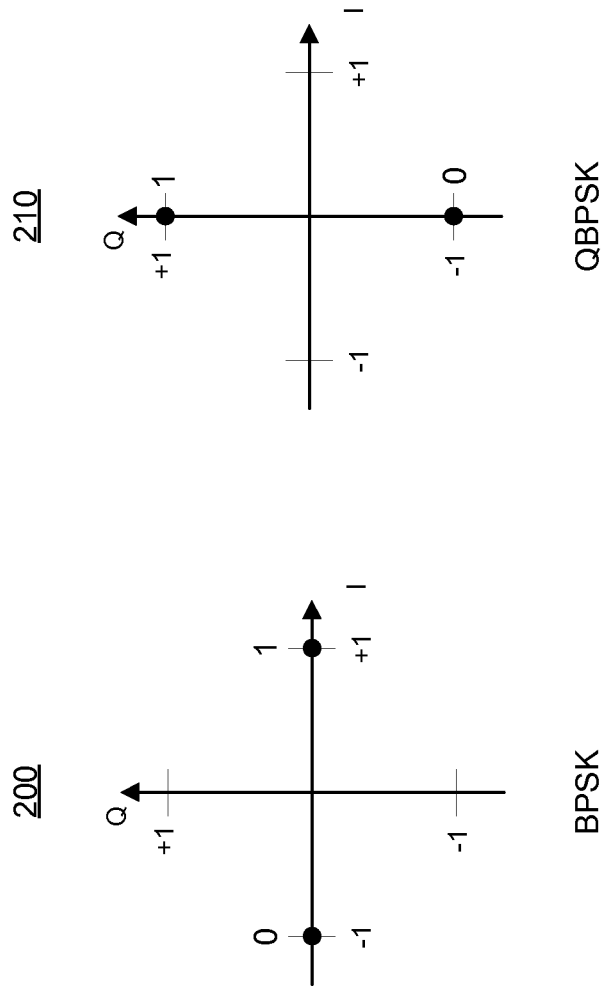
FIG. 4 is a diagram illustrating example modulation techniques used to modulate symbols within signal (SIG) fields of a data unit preamble, according to an embodiment.

The multi-user, normal mode data unit 152 includes an STF 180, a first LTF (LTF1) 182, two OFDM symbols (SIGA1, SIGA2) 184, 186 of a first SIG field, a multi-user STF (MUSTF) 190, multi-user LTFs (MULTFs) 192 for channel estimation for all users, a second SIG field (SIGB) 194 containing user-specific SIG field information, and a multi-user data field 196 carrying data for all users. As seen in FIG. 3, the first and second OFDM symbols 164, 166 of the single-user, normal mode data unit 150 are both modulated using quaternary binary phase shift key (QBPSK) modulation, whereas the multi-user, normal mode data unit 152 utilizes QBPSK modulation for the first SIGA field OFDM symbol 184, but binary phase shift key (BPSK) modulation for the second SIGA field OFDM symbol 186. FIG. 4 provides an illustration of a BPSK symbol constellation 200 and a QBPSK symbol constellation 210. As seen in FIG. 4, QBPSK modulation is identical to BPSK modulation, with the exception that the symbol constellation 210 of QBPSK is rotated by 90 degrees relative to the symbol constellation 200 of BPSK. Thus, in an embodiment, a receiver detects whether a received data unit is single-user or multi-user (e.g., has the format of data unit 150 or data unit 152) by detecting the rotation of the symbol constellation in the second OFDM symbol of the SIG field. Various alternative embodiments of the fields in the multi-user, normal mode data unit 152 are described in more detail in U.S. patent application Ser. No. 13/494,505, now U.S. Pat. No. 8,826,106, and also in U.S. patent application Ser. No. 13/464,467, "Preamble Designs for Sub-1 GHz Frequency Bands," now U.S. Publication No. 2012-0294294, the disclosures of which are hereby incorporated by reference herein in their entireties.

Figure 5:
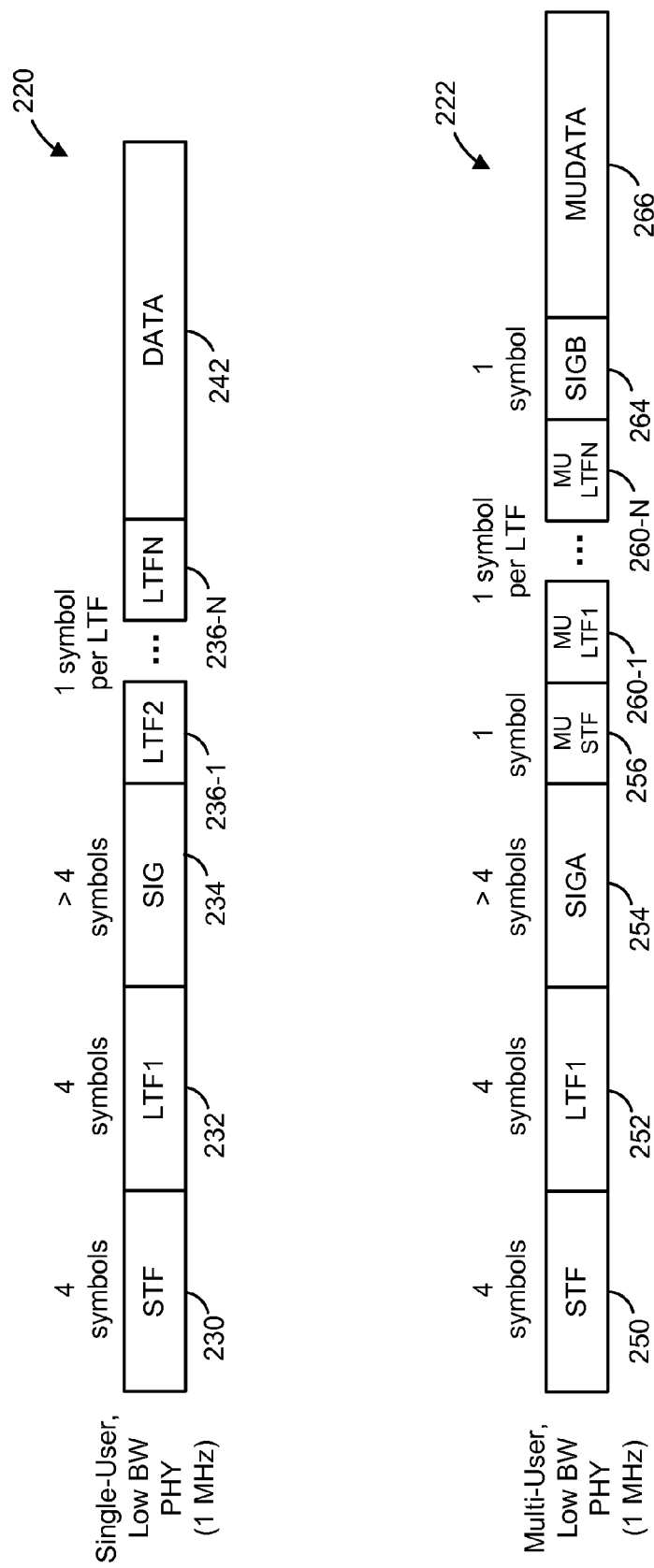
FIG. 5 is a diagram of example single-user and multi-user formats of a low bandwidth mode data unit, according to an embodiment.

FIG. 5 is a diagram comparing an example single-user, low bandwidth mode data unit 220 with an example multi-user, low bandwidth mode data unit 222, according to an embodiment. In one embodiment and scenario, and with reference again to FIG. 1, the single-user, low bandwidth mode data unit 220 is generated by network interface 16 of AP 14 and transmitted to client station 25-1, and the multi-user, low bandwidth mode data unit 222 is generated by network interface 16 of AP 14 and transmitted to two or more of the client stations 25. The single-user, low bandwidth mode data unit 220 includes an STF 230, an LTF (LTF1) 232, a SIG field 234, any additional LTFs 236-1 through 236-N, and a data field 242. In an embodiment, the single-user, low bandwidth mode data unit 220 is the same as the low bandwidth mode data unit 102 of FIG. 2.

The multi-user, low bandwidth mode data unit 222 includes an STF 250, a first LTF (LTF1) 252, a first SIG field (SIGA) 254, a multi-user STF (MUSTF) 256, multi-user LTFs 260-1 through 260-N for channel estimation for all users, a second SIG field (SIGB) 264 containing user-specific SIG field information, and a multi-user data field 266 carrying data for all users. In one embodiment, both the single-user and multi-user low bandwidth mode data units 220, 222 are generated using a 32-point IDFT, with the SIG fields 234, 254 utilizing MCS0 with 2× bit repetition, and with the SIGB field 264 of the multi-user data unit 222 utilizing MCS0 without bit repetition. Moreover, in this embodiment, the MUSTF 256 includes a single OFDM symbol having the same non-zero tones as the STF 250 at the beginning of data unit 222, and the MULTFs 260-1 through 260-N each include a single OFDM symbol such that all spatial streams are trained for all users (e.g., using the same "P matrix" as defined in IEEE 802.11ac).

In some embodiments, low bandwidth mode data units utilize the same MCS and bit repetition (if any) regardless of whether the data units are single- or multi-user data units, but indicate to a receiver whether the data unit is single-user or multi-user based on one or more symbol constellation rotations within a SIG field (e.g., in a manner similar to the single-user and multi-user normal mode data units 150, 152 of FIG. 3, discussed above). For example, in one embodiment, one or more designated OFDM symbols within the SIG field (i.e., SIG field 234 of single-user data unit 220 or SIGA field 254 of multi-user data unit 222) are modulated using either QBPSK or BPSK modulation to indicate to a receiver whether the data unit is single-user or multi-user, respectively (or vice versa).

FIGS. 6A and 6B illustrate two example embodiments in which the symbol constellation rotation for one or more OFDM symbols in the SIG or SIGA field is used to indicate whether a low bandwidth mode data unit is single- or multi-user. Although FIGS. 6A and 6B show embodiments in which the SIG (or SIGA) field of the low bandwidth mode data unit includes six OFDM symbols, other embodiments include more or fewer than six OFDM symbols. In the embodiment of FIG. 6A, the SIG field 300 corresponds to SIG field 234 of the single-user, low bandwidth mode data unit 220 of FIG. 5, and the SIGA field 302 corresponds to SIGA field 234 of the multi-user, low bandwidth mode data unit 222 of FIG. 5. In the single-user SIG field 300, all six OFDM symbols 310-1 through 310-6 use QBPSK subcarrier modulation. Conversely, in the multi-user SIGA field 302, all six OFDM symbols 312-1 through 312-6 use BPSK subcarrier modulation. Thus, a receiver can detect whether a received low bandwidth mode data unit is single- or multi-user based on the detected symbol constellation rotation of any or all of the OFDM symbols in the first SIG field of the data unit.

In the embodiment of FIG. 6B, the SIG field 350 corresponds to SIG field 234 of the single-user, low bandwidth mode data unit 220 of FIG. 5, and the SIGA field 352 corresponds to SIGA field 234 of the multi-user, low bandwidth mode data unit 222 of FIG. 5. In the single-user SIG field 350, only the first OFDM symbol 360-1 uses QBPSK subcarrier modulation, while the remaining five OFDM symbols 360-2 through 360-6 use BPSK subcarrier modulation. Conversely, in the multi-user SIGA field 352, all six OFDM symbols 362-1 through 362-6 use BPSK subcarrier modulation. Thus, a receiver can detect whether a received low bandwidth mode data unit is single- or multi-user based on the detected symbol constellation rotation of the first OFDM symbol in the first SIG field of the data unit.

In alternative embodiments, any other combination of SIG field OFDM symbols is selectively modulated using BPSK or QBPSK to indicate whether the low bandwidth mode data unit is single- or multi-user. Moreover, in some alternative embodiments, symbol constellation rotations are applied to modulation types other than BPS K. For example, in some embodiments, higher-order modulation types are utilized for subcarriers of SIG field OFDM symbols (e.g., QPSK, 16-QAM, etc.), and are selectively rotated by 90 degrees (or any other suitable amount) to indicate whether the low bandwidth mode data unit is single- or multi-user.

While the modulation, coding, and/or bit repetition of a data portion/field of a data unit is typically specified by PHY information in the SIG field, a receiver generally must also know similar parameters for the SIG field itself in order to demodulate and decode the PHY information contained in the SIG field. Thus, in some embodiments, the SIG field of single-user, low bandwidth mode data units use an MCS/repetition that is equal to the worst case MCS/repetition of the data portion (e.g., MCS0, with 2× bit repetition), and therefore is known a priori to the receiver, regardless of which MCS is utilized by the data portion of the data unit. While this approach helps prevent the demodulation and decoding of the SIG field from becoming a bottleneck to the demodulation and decoding of the entire packet, such an approach can result in an unnecessarily long SIG field and preamble in scenarios where a high quality communication channel exists. Accordingly, in an alternative embodiment, the SIG field of a low bandwidth mode data unit can selectively use one of at least two different MCSs (or MCS/repetition combinations). In one embodiment, for example, the SIG field of a low bandwidth mode data unit uses MCS0 with 2× repetition when the data portion of the low bandwidth mode data unit uses MCS0 with 2× repetition, but uses MCS0 with no bit repetition when the data portion uses any higher-order MCS or MCS/repetition combination (e.g., MCS0 with no repetition, MCS1, MCS2, etc.).

In some embodiments, SIG fields using a lower-order MCS or MCS/repetition combination are longer (i.e., include more OFDM symbols) than SIG fields using a higher-order MCS or MCS/repetition combination, in order to accommodate all of the bits needed to specify the SIG field PHY information. For example, in one embodiment, SIG fields using MCS0 without repetition are three OFDM symbols in length, while SIG fields using MCS0 with 2× repetition are six OFDM symbols in length. When referring herein to an embodiment in which the SIG field selectively uses one of two different MCSs or MCS/repetition combinations, the PHY mode corresponding to the higher-order MCS or MCS/repetition combination is referred to as the "SIG-high" mode, and the PHY mode corresponding to the lower-order MCS or MCS/repetition combination is referred to as the "SIG-low" mode.

While this approach allows for a shorter preamble (in some scenarios) while still preventing the demodulation/decoding of the SIG field from becoming a bottleneck to the demodulation/decoding of the entire packet, it does generally require that a receiver be able to learn whether a particular data unit corresponds to SIG-high or SIG-low mode. Thus, in some embodiments, the beginning one or more OFDM symbols of the SIG field are modulated using a symbol constellation rotation that indicates to a receiver whether the SIG field corresponds to SIG-high or SIG-low mode. For example, in one embodiment, the beginning one or more OFDM symbols of the SIG field are selectively modulated using either BPSK or QBPSK to differentiate between the two modes.

Further, in some embodiments, this approach is combined with the approach described above (in connection with FIGS. 5 and 6) for indicating to a receiver whether a low bandwidth mode data unit is a single- or multi-user data unit. In one embodiment, for example, the beginning one or two OFDM symbols of the first SIG field (e.g., SIG field 234 or SIGA field 254 in FIG. 5) selectively use BPSK or QBPSK modulation to differentiate between SIG-high and SIG-low mode, and the remaining OFDM symbol(s) of the first SIG field selectively use BPSK or QBPSK modulation to differentiate between a single- and multi-user data unit. In some embodiments, multi-user data units are not permitted if the data field uses the lowest MCS or MCS/repetition combination (e.g., MCS0 with 2× repetition), and accordingly the first SIG field of a multi-user data unit (e.g., SIGA field 254 in FIG. 5) cannot utilize the SIG-low mode.

Figure 7A:
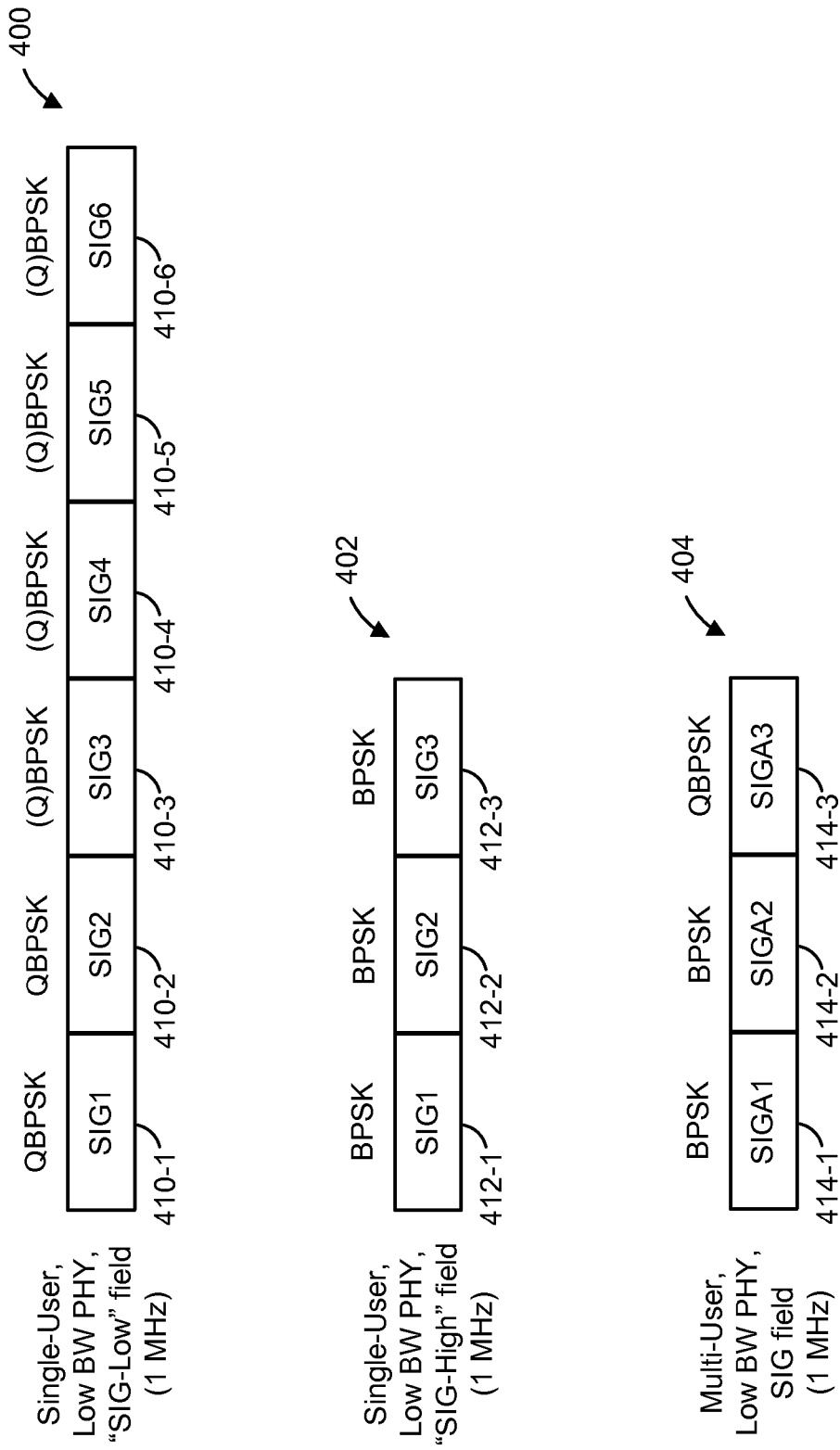
FIG. 7A is a diagram of example SIG fields of low bandwidth mode data units, corresponding to first and second single-user formats and a multi-user format, according to an embodiment.
Figure 7B:
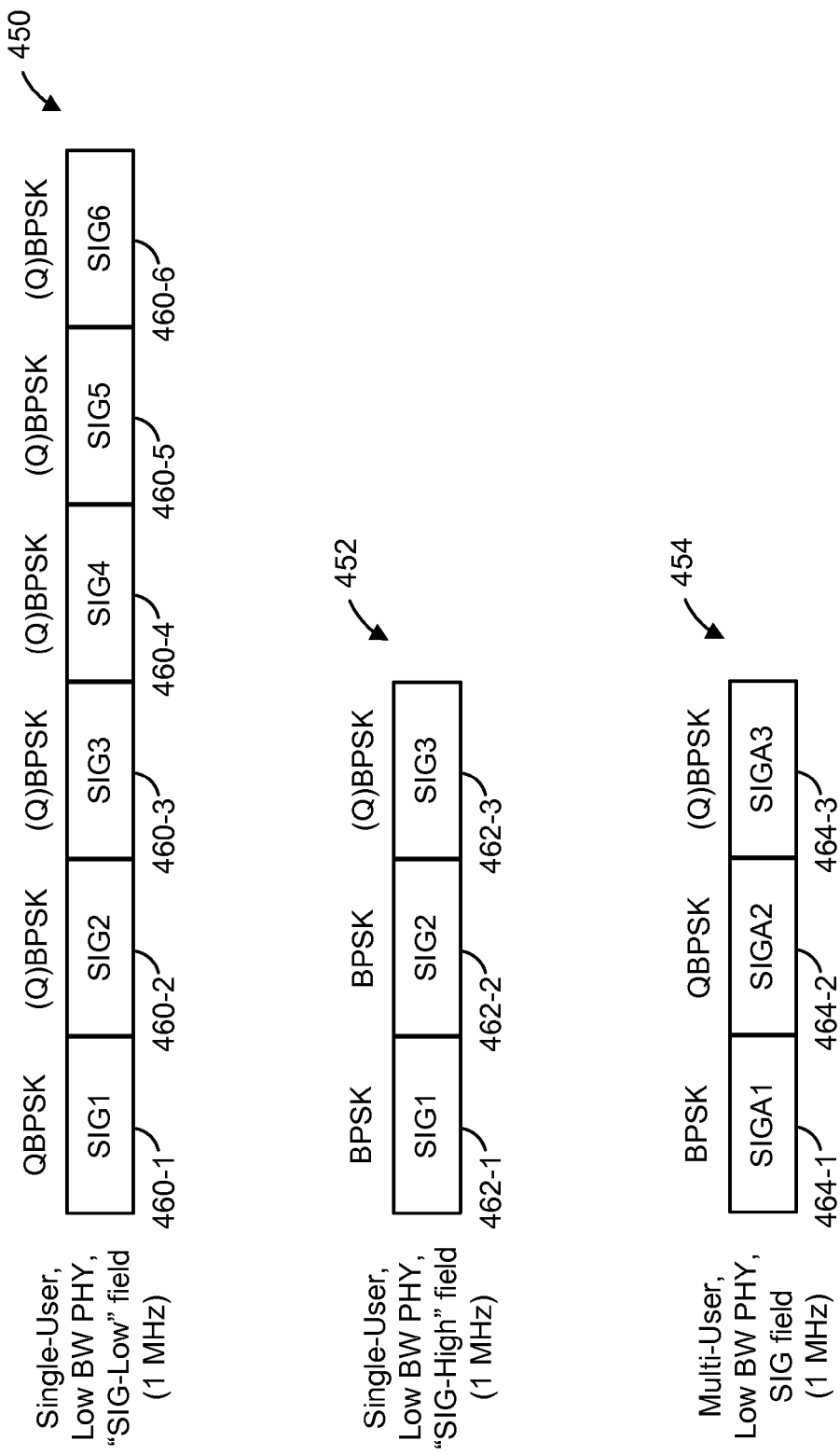
FIG. 7B is a diagram of example SIG fields of low bandwidth mode data units, corresponding to first and second single-user formats and a multi-user format, according to an alternative embodiment.

FIGS. 7A and 7B show two examples of this approach, for embodiments in which multi-user data units do not utilize SIG-low mode. Although FIGS. 7A and 7B show an embodiment in which the SIG (or SIGA) field includes three or six OFDM symbols, other embodiments include more or fewer OFDM symbols. In the embodiment of FIG. 7A, the SIG field 400 and the SIG field 402 correspond to SIG-low and SIG-high instances, respectively, of SIG field 234 of the single-user, low bandwidth mode data unit 220 of FIG. 5, and the SIGA field 404 corresponds to SIGA field 234 of the multi-user, low bandwidth mode data unit 222 of FIG. 5. The beginning two OFDM symbols 410-1, 410-2 of SIG field 400 use QBPSK modulation to indicate to a receiver that the SIG field 400 corresponds to SIG-low mode (e.g., MCS0 with 2× repetition). In this embodiment, the SIG-low mode rules out the possibility that SIG field 400 belongs to a multi-user data unit, and thus the remaining four OFDM symbols 410-3 through 410-6 can be either BPSK modulated or QBPSK modulated. For example, in one embodiment, all six OFDM symbols 410-1 through 410-6 are QBPSK modulated.

The beginning two OFDM symbols 412-1, 412-2 of SIG field 402 instead use BPSK modulation to indicate to a receiver that the SIG field 402 corresponds to SIG-high mode (e.g., MCS0 with no repetition). In this embodiment, the receiver still needs to determine whether SIG field 402 belongs to a single- or multi-user data unit. Thus, the third OFDM symbol 412-3 is BPSK modulated to indicate to the receiver that the SIG field 402 belongs to a single-user data unit.

The beginning two OFDM symbols 414-1, 414-2 of SIGA field 404 likewise use BPSK modulation to indicate to a receiver that the SIGA field 404 corresponds to SIG-high mode (e.g., MCS0 with no repetition). Because the receiver also needs to determine whether SIGA field 404 belongs to a single- or multi-user data unit, the third OFDM symbol 414-3 is QBPSK modulated to indicate to the receiver that the SIGA field 404 belongs to a multi-user data unit.

In the alternative embodiment of FIG. 7B, the SIG field 450 and the SIG field 452 correspond to SIG-low and SIG-high instances, respectively, of SIG field 234 of the single-user, low bandwidth mode data unit 220 of FIG. 5, and the SIGA field 454 corresponds to SIGA field 234 of the multi-user, low bandwidth mode data unit 222 of FIG. 5. The beginning OFDM symbol 460-1 of SIG field 450 uses QBPSK modulation to indicate to a receiver that the SIG field 450 corresponds to SIG-low mode (e.g., MCS0 with 2× repetition). In this embodiment, the SIG-low mode rules out the possibility that SIG field 450 belongs to a multi-user data unit, and thus the remaining five OFDM symbols 460-2 through 460-6 can be either BPSK modulated or QBPSK modulated. For example, in one embodiment, all six OFDM symbols 460-1 through 460-6 are QBPSK modulated.

The beginning OFDM symbol 462-1 of SIG field 452 instead uses BPSK modulation to indicate to a receiver that the SIG field 452 corresponds to SIG-high mode (e.g., MCS0 with no repetition). In this embodiment, the receiver still needs to determine whether SIG field 452 belongs to a single- or multi-user data unit. Thus, the second OFDM symbol 462-2 is BPSK modulated to indicate to the receiver that the SIG field 452 belongs to a single-user data unit. In this embodiment, the third OFDM symbol 462-3 is not needed for determining whether the SIG field 452 corresponds to SIG-high or SIG-low, or for determining whether the data unit of SIG field 452 is single- or multi-user, and may be either BPSK or QBPSK modulated, according to different embodiments.

The beginning OFDM symbol 464-1 of SIGA field 454 likewise uses BPSK modulation to indicate to a receiver that the SIGA field 454 corresponds to SIG-high mode (e.g., MCS0 with no repetition). Because the receiver also needs to determine whether SIGA field 454 belongs to a single- or multi-user data unit, the second OFDM symbol 464-2 is QBPSK modulated to indicate to the receiver that the SIGA field 454 belongs to a multi-user data unit. In this embodiment, the third OFDM symbol 464-3 is not needed for determining whether the SIGA field 454 corresponds to SIG-high or SIG-low, or for determining whether the data unit of SIGA field 454 is single- or multi-user, and may be either BPSK or QBPSK modulated, according to different embodiments.

In alternative embodiments, any other combination of SIG field OFDM symbols (preferably including the OFDM symbol at the beginning of the SIG field) is selectively modulated using BPSK or QBPSK to indicate whether the SIG field corresponds to SIG-high or SIG-low mode, and any combinations of one or more of the remaining OFDM symbols are selectively modulated using BPSK or QBPSK to indicate whether the low bandwidth mode data unit is a single- or multi-user data unit. Moreover, in some alternative embodiments, symbol constellation rotations are applied to modulation types other than BPSK. For example, in some embodiments, higher-order modulation types are utilized for subcarriers of SIG field OFDM symbols (e.g., QPSK, 16-QAM, etc.), and are selectively rotated by 90 degrees (or any suitable other amount) to indicate whether the SIG field corresponds to SIG-high or SIG-low mode, and/or the indicate whether the low bandwidth mode data unit is single- or multi-user.

Figure 8:
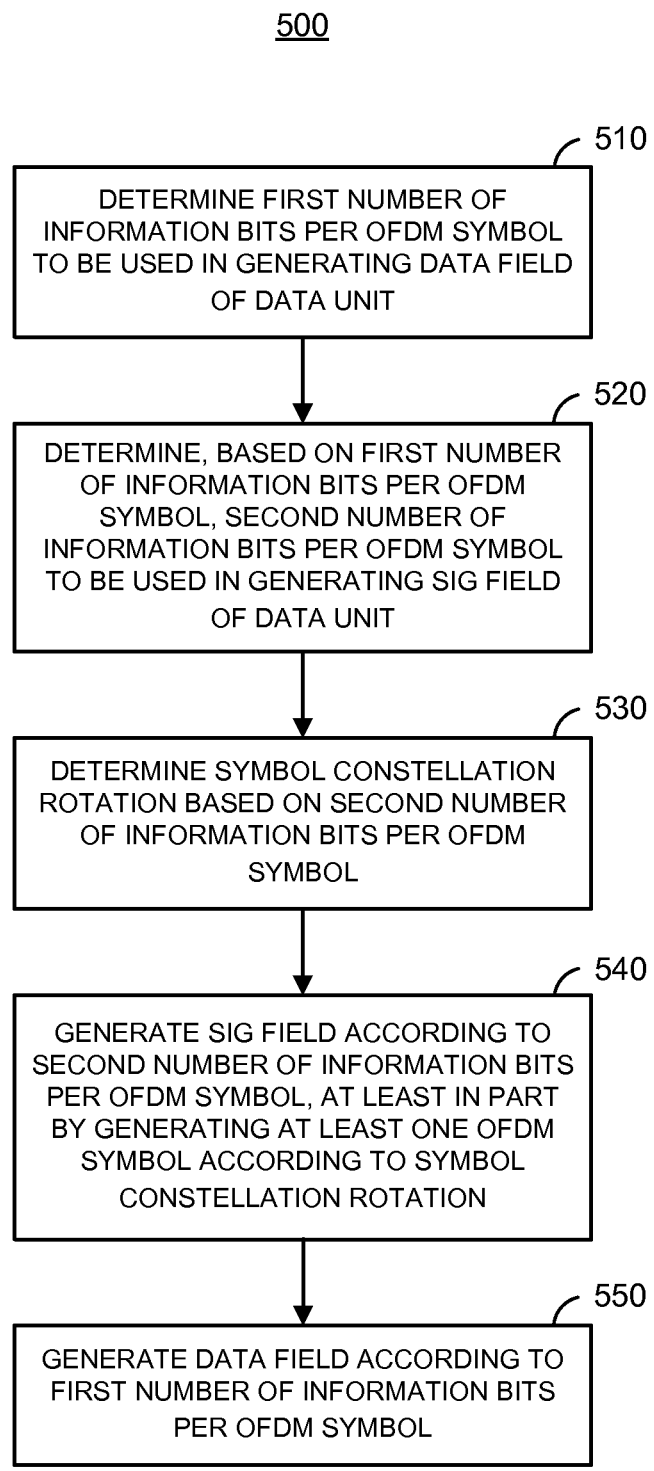
FIG. 8 is a flow diagram of an example method for generating a data unit, according to an embodiment.

FIG. 8 is a flow diagram of an example method 500 for generating a data unit, according to an embodiment. The method 500 is implemented by the network interface 16 of AP 14 or the network interface 27 of client station 25-1 of FIG. 1, in various embodiments and scenarios. In an embodiment, the method 500 is utilized by a network interface of a device when the device is operating in a low bandwidth PHY mode.

At block 510, a first number of information bits per OFDM symbol is determined. The first number of information bits per OFDM symbol represents the number of information bits per OFDM symbol that will be used in generating a data field of a data unit. In various embodiments, a modulation type (BPSK, QPSK, 16-QAM, etc.), a coding rate (1/2, 3/4, 5/6, etc.), a number of bit repetitions (no repetitions, 2×, 4×, etc.), and/or any other parameter that affects the number of information bits per OFDM symbol, is/are determined for the data field at block 510. In an embodiment, the first number of information bits per OFDM symbol is determined based on channel state information (e.g., signal-to-noise ratio, etc.), in order to ensure that the MCS and/or number of repetitions provide sufficiently robust performance in view of current channel conditions.

At block 520, a second number of information bits per OFDM symbol is determined based on the first number of information bits per OFDM symbol determined at block 520. The second number of information bits per OFDM symbol represents the number of information bits per OFDM symbol that will be used in generating a SIG field of the data unit. In various embodiments, a modulation type (BPSK, QPSK, 16-QAM, etc.), a coding rate (1/2, 3/4, 5/6, etc.), a number of bit repetitions (no repetitions, 2×, 4×, etc.), and/or any other parameter that affects the number of information bits per OFDM symbol, is/are determined for the SIG field at block 520. In an embodiment, the second number of information bits per OFDM symbol is set equal to the first number of information bits per OFDM symbol (e.g., the same MCS or MCS/repetitions) if the first number of information bits per OFDM symbol (for the data field) corresponds to a lowest allowable MCS (or MCS/repetition combination), and is set to a number corresponding to a second-lowest MCS (or MCS/repetition combination) otherwise.

At block 530, a symbol constellation rotation is determined based on the second number of information bits per OFDM symbol determined at block 520. In one embodiment, for example, either BPSK or QBPSK is selected at block 530 for at least a first OFDM symbol of the SIG field based on a modulation type, coding rate, and/or number of bit repetitions for the SIG field at block 520 (e.g., BPSK if a lower-order MCS or MCS/repetition combination will be used for the SIG field, or QBPSK if a higher-order MCS or MCS/repetition combination will be used for the SIG field).

At block 540, a SIG field of the data unit is generated according to the second number of information bits per OFDM symbol (determined at block 520), with at least one OFDM symbol of the SIG field being generating according to the symbol constellation rotation determined at block 530. For example, in one embodiment and scenario where BPSK modulation, 1/2 rate coding, and 2× repetition is determined for the SIG field at block 520, that MCS and bit repetition is used to generate each OFDM symbol of the SIG field at block 540, with at least one OFDM symbol (e.g., the beginning one or more OFDM symbols of the SIG field) being generated using either BPSK or QBPSK modulation depending on whether a zero degree constellation rotation or a 90 degree constellation rotation, respectively, was determined at block 530. The SIG field provides a receiver with PHY information for interpreting at least the data field of the data unit (e.g., MCS of the data field, length of the data field, etc.).

At block 550, a data field of the data unit is generated according to the first number of information bits per OFDM symbol (determined at block 510). For example, in one embodiment and scenario where QPSK modulation and rate 3/4 coding is determined for the data field field at block 510, the OFDM symbols of the data field are generated using QPSK modulation and rate 3/4 coding.

In some embodiments, the method 500 includes additional blocks not shown in FIG. 8. In one embodiment, for example, the method 500 includes a block in which an additional symbol constellation rotation is determined based on whether the data unit being generated is a single- or multi-user data unit. In this embodiment, generating the SIG field at block 540 further includes the generation of at least one other OFDM symbol according to the additional determined rotation.

Figure 9:
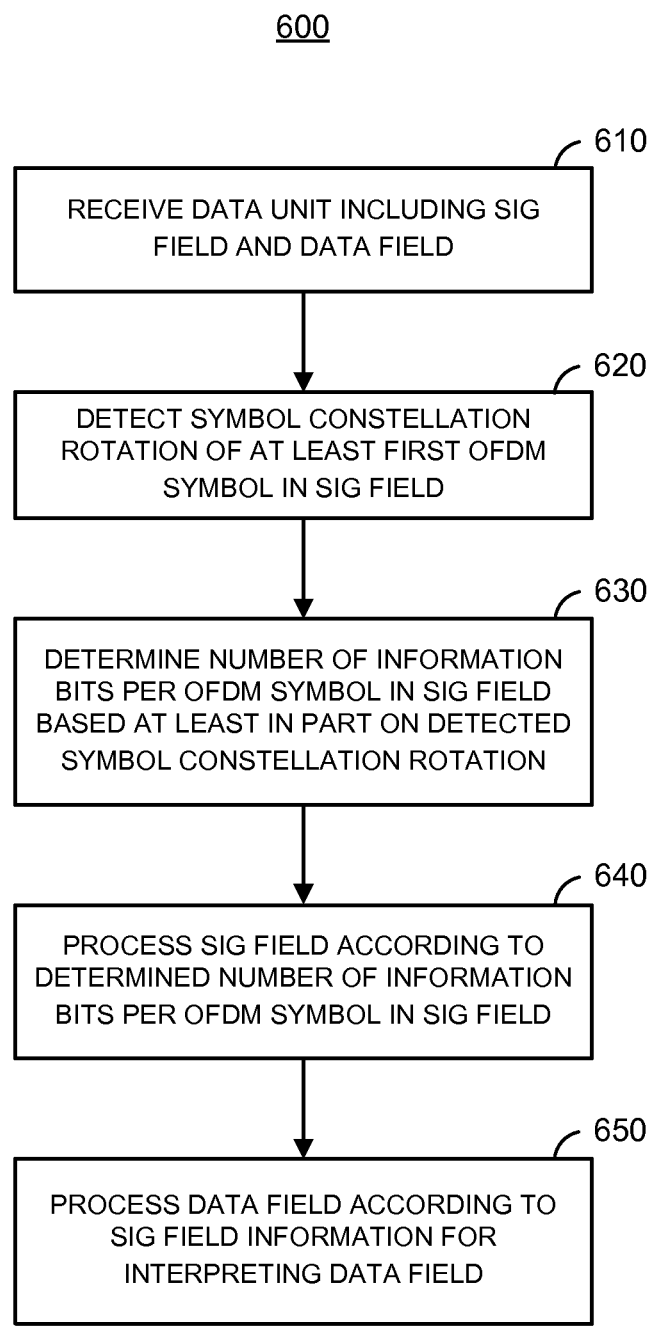
FIG. 9 is a flow diagram of an example method for receiving and processing a data unit, according to an embodiment.

FIG. 9 is a flow diagram of an example method 600 for receiving and processing a data unit, such as a data unit generated according to method 500 of FIG. 8, according to an embodiment. The method 600 is implemented by the network interface 27 of client station 25-1 or the network interface 16 of AP 14 of FIG. 1, in various embodiments and scenarios.

At block 610, a data unit that includes a SIG field and a data field is received via a communication channel and one or more antennas. In an embodiment, the data unit is a low bandwidth mode data unit such as the single-user data unit 220 or multi-user data unit 222 of FIG. 5, for example. Moreover, in an embodiment, the data unit includes a SIG field similar to one of the SIG (or SIGA) fields of FIG. 7A or 7B. In some embodiments, however, the SIG field does not indicate whether the data unit is single- or multi-user. The SIG field provides PHY information that allows a receiver to interpret at least the data field of the data unit. In some embodiments, the data unit includes other fields as well, such as an STF and LTF preceding the SIG field.

At block 620, a symbol constellation rotation of at least a first OFDM symbol in the SIG field of the data unit received at block 610 is detected. In one embodiment, the first OFDM symbol is the beginning OFDM symbol of the SIG field (i.e., the first sequentially within the SIG field). In other embodiments, the first OFDM symbol is later in the sequence of SIG field OFDM symbols. In some embodiments, the symbol constellation rotation is detected over a span of two or more OFDM symbols of the SIG field (e.g., the beginning two OFDM symbols of the SIG field, in an embodiment). In some embodiments, a receiver detects whether a modulation type has a zero degree or 90 degree constellation rotation. For example, in one embodiment, whether the first OFDM symbol, or multiple OFDM symbols, of the SIG field is/are BPSK or QBPSK modulated is detected at block 620.

At block 630, a number of information bits per OFDM symbol in the SIG field is determined, based at least in part on the symbol constellation rotation detected at block 620. For example, in various embodiments, a modulation type, coding rate, and/or number of bit repetitions is determined at block 630. As one more specific example, it is determined at block 630 whether the SIG field utilizes MCS0 with 2× repetition, or MCS0 without bit repetition, based on whether BPSK or QBPSK modulation is detected (at block 620) in one or more OFDM symbols.

At block 640, the SIG field of the data unit received at block 610 is processed (e.g., demodulated and decoded) according to the number of information bits per OFDM symbol in the SIG field (e.g., the determined modulation type, coding rate, and/or bit repetition, in various embodiments), as determined at block 630.

At block 650, the data field of the data unit received at block 610 is processed (e.g., demodulated and decoded) according to the PHY information, included in the SIG field processed at block 640, for interpreting the data unit.

In some embodiments, the method 600 includes additional blocks not shown in FIG. 9. In one embodiment, for example, the method 600 includes a first additional block in which another symbol constellation rotation is detected in at least a second OFDM symbol of the SIG field, and a second additional block in which it is determined, based on that detected rotation, whether the data unit received at block 610 is a single- or multi-user data unit.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method comprising:
receiving a data unit that includes (i) a data field and (ii) a preamble that includes a first signal (SIG) field, wherein the first SIG field provides information for interpreting the data field;
detecting a symbol constellation rotation of an orthogonal frequency division multiplexing (OFDM) symbol of the first SIG field;
determining, based at least in part on the detected symbol constellation rotation, whether the preamble is arranged according to a short format or a long format, wherein when the preamble is arranged according to the long format, the data unit includes a second signal field that is omitted from the data unit when the preamble is arranged according to the short format;
processing at least the first SIG field of the preamble; and
processing the data field of the data unit according to the information for interpreting the data field as provided in at least the first SIG field of the preamble.

2. A method according to claim 1, wherein detecting the symbol constellation rotation includes detecting whether the OFDM symbol is binary phase shift key (BPSK) modulated or quaternary BPSK (QBPSK) modulated.

3. A method according to claim 2, wherein determining, based at least in part on the detected symbol constellation rotation, whether the preamble is arranged according to the short format or the long format comprises:
when it is detected that the OFDM symbol in the first SIG field is BPSK modulated, determining that the preamble is arranged according to the long format, and
when it is detected that the OFDM symbol in the first SIG field is QBPSK modulated, determining that the preamble is arranged according to the short format.

4. A method according to claim 1, wherein when the preamble is arranged according to the long format, the data unit further includes at least one short training field not included in the data unit when the preamble is arranged according to the short format.

5. An apparatus comprising:
a network interface configured to
receive a data unit that includes (i) a data field and (ii) a preamble that includes a first signal (SIG) field, wherein the first SIG field provides information for interpreting the data field;
detect a symbol constellation rotation of an orthogonal frequency division multiplexing (OFDM) symbol of the first SIG field;
determine, based at least in part on the detected symbol constellation rotation, whether the preamble is arranged according to a short format or a long format, wherein when the preamble is arranged according to the long format, the data unit includes a second signal field that is omitted from the data unit when the preamble is arranged according to the short format;
process at least the first SIG field of the preamble; and
process the data field of the data unit according to the information for interpreting the data field as provided in at least the first SIG field of the preamble.

6. An apparatus according to claim 5, wherein the network interface is configured to detect the symbol constellation rotation at least by detecting whether the OFDM symbol is binary phase shift key (BPSK) modulated or quaternary BPSK (QBPSK) modulated.

7. An apparatus according to claim 6, wherein the network interface is configured to determine based at least in part on the detected symbol constellation rotation, whether the preamble is arranged according to the short format or the long format at least by:
when it is detected that the OFDM symbol in the first SIG field is BPSK modulated, determining that the preamble is arranged according to the long format, and
when it is detected that the OFDM symbol in the first SIG field is QBPSK modulated, determining that the preamble is arranged according to the short format.

8. An apparatus according to claim 5, wherein when the preamble is arranged according to the long format, the data unit further includes at least one short training field not included in the data unit when the preamble is arranged according to the short format.

9. A method for generating a data unit, the method comprising:
determining whether a preamble of the data unit is to be arranged according to a short format or a long format;
determining, based on whether the preamble is to be arranged according to the short format or the long format, a symbol constellation rotation for an orthogonal frequency division multiplexing (OFDM) symbol of a first signal (SIG) field of the preamble of the data unit;
generating the first SIG field of the preamble of the data unit, wherein
the first SIG field provides information for interpreting a data field of the data unit, and
generating the first SIG field includes generating the OFDM symbol of the first SIG field according to the first symbol constellation rotation;
generating the preamble of the data unit according to the short format or the long format, wherein the preamble is generated to include at least the first SIG field; and
generating the data unit to include at least the preamble and the data field, wherein
when the preamble is generated according to the long format, generating the data unit to further include a second signal field, and
when the preamble is generated according to the short format, generating the data unit to omit the second signal field.

10. A method according to claim 9, wherein determining the symbol constellation rotation includes selecting binary phase shift key (BPSK) modulation or quaternary BPSK (QBPSK) modulation for the OFDM symbol of the first SIG field.

11. A method according to claim 10, wherein determining the symbol constellation rotation includes:
when it is determined that the preamble is to be arranged according to the long format, selecting BPSK modulation for the OFDM symbol of the first SIG field, and
when it is determined that the preamble is to be arranged according to the short format, selecting QBPSK modulation for the OFDM symbol of the first SIG field.

12. A method according to claim 9, wherein when the preamble is generated according to the long format, generating the data unit to further include a short training field not included in the data unit when the preamble is generated according to the short format.

13. An apparatus comprising:
a network interface configured to
determine whether a preamble of a data unit is to be arranged according to a short format or a long format;
determine, based on whether the preamble is to be arranged according to the short format or the long format, a symbol constellation rotation for an orthogonal frequency division multiplexing (OFDM) symbol of a first signal (SIG) field of the preamble of the data unit;

generate the first SIG field of the preamble of the data unit, wherein
the first SIG field provides information for interpreting a data field of the data unit, and
generating the first SIG field includes generating the OFDM symbol of the first SIG field according to the first symbol constellation rotation;

generate the preamble of the data unit according to the short format or the long format, wherein the preamble is generated to include at least the first SIG field; and generate the data unit to include at least the preamble and the data field, wherein
when the preamble is generated according to the long format, the data unit is generated to further include a second signal field, and
when the preamble is generated according to the short format, the data unit is generated to omit the second signal field.

14. An apparatus according to claim 13, wherein the network interface is configured to determine the symbol constellation rotation at least by selecting binary phase shift key (BPSK) modulation or quaternary BPSK (QBPSK) modulation for the OFDM symbol of the SIG field.

15. An apparatus according to claim 14, wherein the network interface is configured to determining the symbol constellation rotation at least by:
when it is determined that the preamble is to be arranged according to the long format, selecting BPSK modulation for the OFDM symbol of the first SIG field, and
when it is determined that the preamble is to be arranged according to the short format, selecting QBPSK modulation for the OFDM symbol of the first SIG field.

16. An apparatus according to claim 15, wherein the network interface is configured to when the preamble is generated according to the long format, generate the data unit to further include a short training field not included in the data unit when the preamble is generated according to the short format.

* * * * *